June 17, 1930.  J. C. BOGLE  1,765,297
ELECTRICAL SWITCH
Filed Dec. 2, 1926
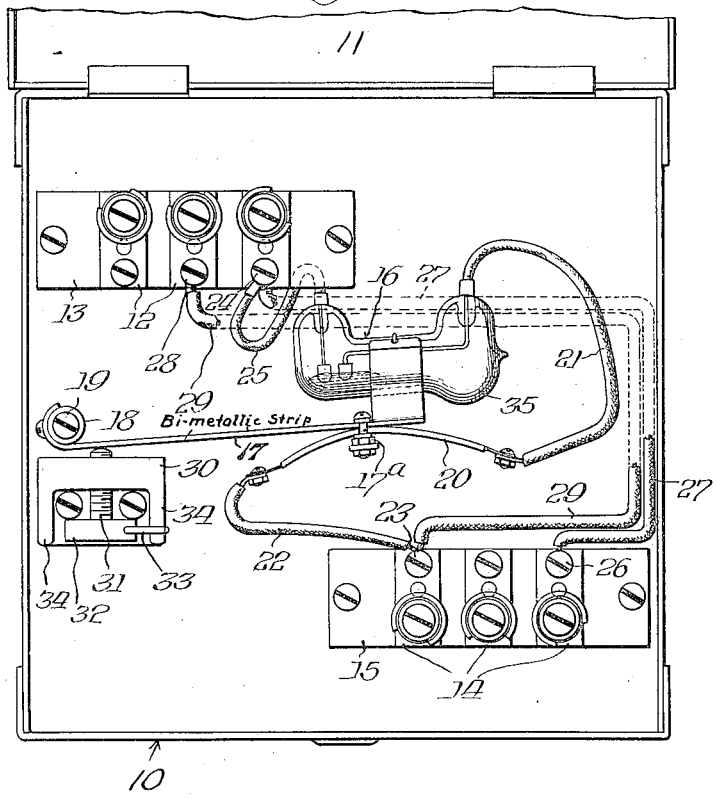
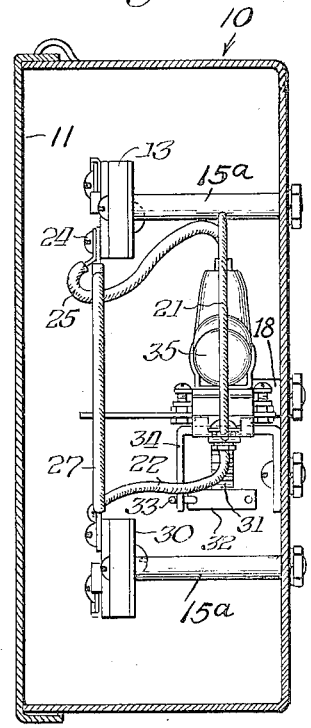
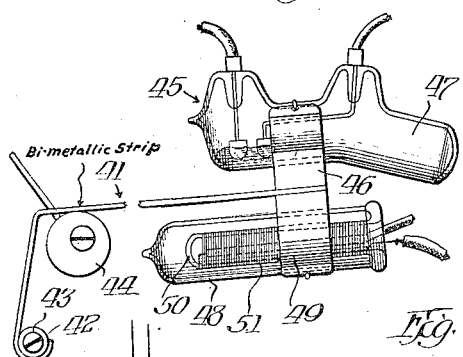
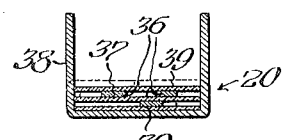
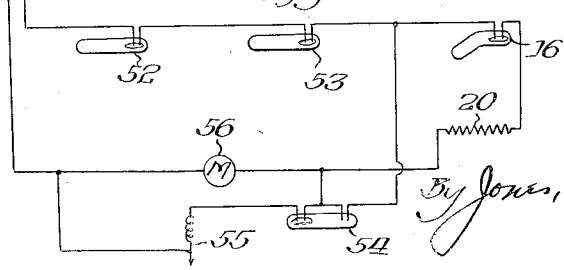
Inventor
John C. Bogle.
By Jones, Addington, Ames & Field
Attys Patented June 17, 1930

1,765,297

UNITED STATES PATENT OFFICE

JOHN C. BOGLE, OF RIVER FOREST, ILLINOIS, ASSIGNOR, BY MESNE ASSIGNMENTS, TO TIME-O-STAT CONTROLS COMPANY, OF ELKHART, INDIANA, A CORPORATION OF MARYLAND

ELECTRICAL SWITCH

Application filed December 2, 1926. Serial No. 152,123.

This invention relates to electrical switches and has special reference to thermostatically controlled switching means.

More particularly this invention relates to tiltable switches actuated from a thermostatically operated actuator requiring a minimum amount of energy and adapted to control the actuation of said switch with marked positiveness.

Although this invention may be employed in any instance where it is desired to effect a circuit change at a predetermined time, that is, to control the period between the occurrence of a certain event and the time when the switch shall change the circuit connections, it is particularly adapted to be used as a final safety switch in an electrical circuit employing other switching appliances for the normal control of a system, the present invention to operate only when said system is out of running condition whereupon it will act alone to control said electrical circuit.

Hereinafter this invention will be described in connection with an automatic heating system, in which latter the switch may be used with great effectiveness. It is usual in all types of automatic heating systems to control the devices which permit fuel to flow and to urge combustion by providing switching means of various types in a single electrical circuit. For example, a heat responsive switch known as a "stack switch" is disposed in the smoke-stack of a heating system and is operated by the heat from the fuel burned therein; a pressure or temperature switch is disposed in the boiler or furnace of the heating system and is operated by the pressure or temperature created therein; and a room switch is disposed in a room or other enclosure and is responsive to variations of temperature therein for directing the generation of heat in order that there will be a balance between supply and demand. An assembly of these devices is connected in an electrical circuit for controlling the fuel supply and the ignition thereof in said system.

Upon the closing of the electrical circuit in the aforementioned switches, should the burner fail to ignite for lack of oil, the motor fail to operate, or some element in the ignition system be out of order, or from other like causes, the use of the present invention in said electrical circuit would cause both the fuel supply and the ignition means to become disconnected from the line because an open circuit is obtained in the hereinafter described manner.

Moreover, by means of the novel construction of this switch, after having obtained an open circuit position through the switch, a closed circuit is not possible except by manual restoration, and this precludes the possibility of the system becoming operative until the operator has become aware of the inoperativeness of the system, whereupon, of course, this defective condition may be corrected.

The foregoing is but one illustration of many uses of the present invention, and as heretofore mentioned, the switch may be utilized in any instance where it is desired to effect a circuit change at a predetermined time, and particularly when this circuit change acts as a safety measure.

One of the objects of this invention is to provide an improved timed switch.

A further object of this invention is to provide a tiltable switch actuated by a thermostatically operated actuator which will require a minimum amount of energy and which will be controlled with marked effectiveness.

A further object of this invention is to provide a safety switch for use in a system employing other switches, said safety switch to be used as a final switch for effecting the inoperativeness of the entire system in the event of any irregularities therein.

A further object is to provide a safety switch of the character indicated above which, when operated into one position, may be returned to its original position only by manual restoration.

Further objects and advantages will be apparent from the description and drawings forming a part of this specification, to which reference may now be had for a more complete understanding of the characteristic features of this invention, in which drawings:

Figure 1 is a front elevational view of a preferred form of the present invention with the cover in an open position;

Fig. 2 is a side elevational view of Fig. 1 showing the casing in section and the cover in a closed position;

Fig. 3 is a front elevational view of the operating mechanism of another form of this invention;

Fig. 4 is a top plan view of one form of heating element embodied in Fig. 1 of this invention showing the top sides thereof bent back in a vertical plane;

Fig. 5 is a sectional view taken on the line 5—5 of Fig. 4; and

Fig. 6 is a diagrammatic view of an electrical circuit employing the present invention.

Referring now more particularly to the drawings, this invention comprises a casing 10 with a cover 11 pivotally secured thereto, a plurality of contact-strips 12 secured to an insulated terminal block 13 and a second set of contact-strips 14 secured to an insulated terminal block 15, both terminal blocks being secured to posts 15ª which extend from the casing.

A mercury tube contactor switch 16 is mounted in a clip, which clip is on a bimetallic element 17, which latter is, in turn, fixed to a post 18 fixedly mounted on the casing 10 by screw member 19. A heating element 20 is secured to the underneath portion of the bimetallic element 17 by means of a bolt 17ª, one end of said heating element 20 being connected by wire 21 to one of the electrodes in the tube 16 and the other end of said heating element 20 being connected by wire 22 to a binding post 23. The second electrode in tube 16 is connected to a binding post 24 by means of a wire 25. The binding post 24 is connected to a binding post 26 by means of a wire 27 while binding post 23 is connected to a binding post 28 by means of wire 29.

In the operation of this switch, when the heating element 20 is supplied with current, the heat thus generated rises and serves to bend the bimetallic element 17 which action tilts the tube 16 and causes the mercury therein to flow in one direction and break the electrical circuit existing therethrough. In order to provide for regulating the operation of the switch within very close limits, an adjustment is afforded comprising a bracket 30 secured to the wall of the casing 10 and having an adjustable screw portion 31 in threaded engagement therewith for bearing against the bimetallic element 17. The screw portion is provided with a head 32 from which a pin 33 extends, said pin being limited in its movement by means of arms 34 extending from said bracket.

The aforementioned adjustment is disposed just below and adjacent the fixed end of the bimetallic element. In the operation of this adjusting element, it will be apparent that should the screw portion extend a greater distance through the bracket 30, the bimetallic element would be raised and a greater tilt of the mercury tube 16 would be obtained in one direction which would necessitate a greater flexing of the bimetallic element, when heated, to cause said tube to tilt in an opposite direction to break the electrical circuit existing therethrough.

In adapting this switch for use as a safety means, in a system utilizing various switches as hereinbefore discussed, it is desirable that provisions be made whereby the present invention, after its use as a safety means, can be restored to an operative position by manual means only. To accomplish this purpose, the tube 16 is provided with a well 35 in one end opposite to that in which the electrodes are disposed. This well is furnished, as shown in Fig. 1, by means of a depressed portion extending below the lowest level of the main portion of the tube. This construction provides that upon the breaking of the circuit by means of the flexing of the bimetallic element to cause the mercury to flow in a direction away from the electrodes, the mercury will become deposited in the well 35 and will necessarily remain therein because a return to a normal position of the bimetallic element will not produce a sufficient tilt to cause the mercury to flow from said well. After any defect in the system has been corrected, the bimetallic element may be lifted manually to a position where the mercury may return to a normal closed position.

The heating element 20 comprises a resistance element 36 in the form of a ribbon which is wound around a strip of mica 37 any desired number of times, the coils being spaced and insulated from each other. The heating element is disopsed in a casing comprising preferably a single sheet of metal 38 and is insulated therefrom by strips of mica 39, said heating element having enlarged ends 40 extending from said casing for use as terminals.

It is to be noted particularly that this construction affords a heating element which is extremely delicate in measuring the duration of the interval before the contactor 16 is opened by the warping of the bimetallic element 17, and that the construction is rugged to endure overloads.

In any heating element traversed by an electrical current, a prescribed length of electrical conductor designed to develop high temperatures is joined to terminals designed to develop little or no temperature increase. It is usually good practice to swage, braze, weld or otherwise join the ends of the active conductor or heater element to the terminals, the terminals being of increased cross section and capable of enduring high temperatures. In the present invention the terminals are formed integral with the heating element, thus avoiding the necessity of joining several pieces together and eliminating the possibility of improperly made joints.

A further advantage of such construction becomes apparent where the heating element is called upon to function with currents of changing magnitude, as, for example, when connected in series with motors which require excessive currents at starting. It is desirable to retard the increase of temperature in the heater element during these periods, which are of a short duration, so that this influence on the switch timing will be negligible and that the heater element will not be subjected to rises of temperature out of proportion to the tolerating qualities of the material employed therein. To this end, it will be noted that the heater element is preferably flat and is held in good thermal contact with thin insulating plates which, in turn, are in good thermal contact with the metal case enveloping them. The material of these plates is chosen for its good thermal conductivity and for the permanence of its insulation at high temperatures. The casing 38 has a double function, it acting as a reservoir for heat, smoothing out the peaks and valleys of the heat application before delivering the heat to the bimetallic element 17 and as a clamping means for holding the heating element 36 and interposed insulating plates firmly in permanent thermal contact with itself.

The active conductor or heating element 36 is wholly within the casing or zone of thermal contact. The enlarged ends 40 of the element project from the casing and emit their heat at much lower temperatures than would the heating element proper were the same similarly disposed in the air. These enlarged ends 40 in their use as terminals can be bolted or otherwise secured to lead wires without any consequent damage due to overheating.

Referring particularly to Fig. 3, a modified form of operating mechanism is shown comprising a bimetallic element 41 pivotally mounted on a post 42 fixed to the wall of the casing 10 by means of a screw 43, the bimetallic element resting on a cam 44 which is also pivotally mounted on the wall of said casing 10. A mercury tube contactor 45 is mounted on a clip 46 fixed to the free end of the bimetallic element 41. This tube is also provided with a well 47 formed by bending one end of the tube at an angle of declination with the main body portion. It is preferable in this construction to start the bend at the point reached by the mercury just prior to the breaking of its contact with the electrodes. In this manner, a quicker break will result and the mercury will flow in a coherent mass over the bend and into the well without dividing into separate masses.

The heating element 48 of this construction is positioned below the bimetallic element 41 and is disposed in a clip 49 fixed to said bimetallic element and comprises an elongated tube having a reentrant portion 50 about which a coil 51 is wound. It will be noted that the heating coil is disposed interiorly of said tube and sealed therein. Also that each turn of the coil is insulated one from the other by a strip of mica positioned along the top of the reentrant portion and underneath the coil, while the ends of the heating coil are sealed in the reentrant portion and are connected to suitable lead-in wires.

The operation of the mechanism as shown in Fig. 3 is substantially the same as that shown in Fig. 1. When the heating element is supplied with sufficient current to bend the bimetallic element 41, the tube 45 is tilted in a direction to cause the mercury to flow from its normal closed position to break contact and deposit in the well 47, whereafter the mercury may be restored to its normal position only by manual means. In this instance, the operation of the switching mechanism is regulated by the cam 44 which may be rotated to raise or lower the bimetallic element and thus create the variation in the amount of heat required to tilt the tube and thus break the contact.

Referring to Fig. 6, a wiring diagram is shown wherein this invention is connected in an electrical circuit of an oil burning system including a room switch 52, a pressure switch 53, a stack switch 54, a magnetic valve or ignition control 55, and a motor 56. Assuming that it is desired to start up the oil burner, the switches 52 and 53 will be closed and the switch 16 will also be closed because the resistance element is cool and current will flow directly through the motor. Moreover, switch 54 will be closed when cold, with the mercury to the left so that current will flow through the valve or ignition circuit whereby said ignition circuit is connected directly across the motor, and it will be noted that the entire motor current will flow directly through the resistance element 20 of the safety switch. Presuming that the burner ignites and that the aforementioned circuit condition exists only momentarily, the stack switch 54 will move to a hot position, that is, the mercury will move to the right, and disconnect the ignition circuit and cause less current to flow through the resistance element 20. At this point a low resistance circuit is connected in shunt to the high resistance circuit of the safety switch, and consequently, substantially none of the motor current will flow directly through the resistance element 20. The ignition circuit is now open and the switch 16, which is still in closed circuit position, will remain closed and act as a final safety switch. If now the temperature of the room to be heated reaches its maximum, the switch 52 will then open the circuit and the motor will be disconnected from the line. This permits the stack switch 54 to cool and to move into a cold position with the mercury to the left.

Should the oil burner not ignite when the ignition circuit is closed for reasons hereinbefore stated, the stack switch will not be heated and, therefore, will remain in a cold position with the mercury to the left. As a consequence, the current supplied to the motor will continue to flow through the switch 16 and the resistance 20 for an undue length of time. This will produce a sufficient amount of heat to actuate the switch 16 into an open circuit position with the mercury flowing into the well, and thereafter can be restored only by manual operation. It should be noted that when the switch 16 is in such open circuit position, both the motor and the ignition circuit are disconnected from the line.

The term "mercury electric contactor" as employed herein and as specified in the claims refers to a mercury electric switch which comprises an hermetically sealed container, electrodes disposed therein, and a body of mercury that is adapted to make and break the electric circuit between the electrodes. The materials employed in manufacturing a contactor of the aforesaid character may be those described in U. S. Patent No. 1,598,874 of September 7, 1926, but, of course, it is to be understood that the term "mercury electric contactor" as I employ it herein is not limited to the specific form of mercury electric contactor that is illustrated in the drawing of the aforesaid patent.

While but two embodiments of this invention are herein shown and described with relation to a single application of the same, it is to be understood that this device is not to be limited to these specific structures and the single application, since various modifications may be apparent to one skilled in the art without departing from the spirit and scope of this invention, and therefore, the same is to be limited only by the scope of the appended claims and the prior art.

I claim:

1. In a device of the class described, a horizontally disposed heat responsive element secured at one end to a fixed pivot, a tiltably actuated switch mounted wholly on the other end thereof and actuated thereby, an electrical heating element having its circuit connected through said tiltable switch for operating said heat responsive element, and adjustable means independent of said fixed pivot and associated with said heat responsive element for predetermining the amount of current required by said heating element to tilt said tiltable switch.

2. In a device of the character described, a horizontally disposed heat responsive element pivotally secured at one end, a tiltably actuated switch mounted wholly on the other end thereof and actuated thereby, an electrical heating element having its circuit connected through said tiltable switch for operating said heat responsive element, and an independently mounted adjustable support for holding said heat responsive element in a predetermined position.

3. In a device of the character described, a horizontally disposed heat responsive element pivotally secured at one end and the other end thereof being unrestrained, a tiltably actuated switch mounted wholly on the unrestrained end and actuated thereby, a heating element carried by said heat responsive element for operating the same, a support disposed below and adjacent the pivotal end of said heat responsive element, and an adjusting means mounted on said support for holding said heat responsive element in a predetermined position.

4. In a device of the character described, a horizontally disposed heat responsive element pivotally secured at one end and the other end thereof being unrestrained, a tiltably actuated switch mounted wholly on the unrestrained end and actuated thereby, a heating element carried by said heat responsive element for operating the same, and adjustable means for holding said heat responsive element in a predetermined position.

5. In a device of the class described, a tiltably actuated mercury electric contactor having a depressed portion formed in the container thereof into which depressed portion the mercury is adapted to be held when the said contactor is tilted to open circuit position, and an actuator upon which said contactor is wholly mounted, said actuator serving to tilt said contactor to open circuit position only and said contactor being only returnable to closed circuit position by forcing the mercury from said depressed portion independently of said actuator.

6. In a device of the class described, a tiltably actuated mercury electric contactor having a well formed in the container thereof at the end opposite to the electrodes, and an actuator for tilting said contactor only to open circuit position whereby the mercury will flow into said well, said contactor being movable independently of said actuator for removing the mercury from said well whereby the contactor will be restored to closed circuit position.

7. In a device of the class described, a horizontally disposed heat responsive element fixed at one end, a tiltably actuated mercury electric contactor the container of which has a well formed at one end thereof, said contactor being so mounted as to be actuated to open circuit position only by the other end of said heat responsive element, a heating element actuating said heat responsive element into a position whereby the mercury of the contactor will flow into said well and thus open the electrical circuit through said contactor, the said contactor being movable independently of said heat responsive element whereby said mercury may be returned to normal position in the container.

8. In a device of the class described, a horizontally disposed heat responsive element pivotally secured at one end, a tiltably actuated mercury electric contactor having its container provided with an end portion disposed at an angle to the main body portion of the container, said contactor being mounted wholly on the other end of said heat responsive element and said actuator serving to tilt said contactor to open circuit position only, an adjustable support for holding said heat responsive element in a desired position, a heating element mounted on said heat responsive element for actuating the same into a position whereby the mercury in said container will flow only into said end portion and break the electrical circuit in said contactor, said mercury being restorable to normal position in said container independently of said heat responsive element.

9. An electric switch comprising a heat responsive actuator pivotally fixed at one end and the other end thereof being unrestrained, a tiltably actuated electric switch wholly mounted on said actuator and adapted to be tilted thereby to open circuit position only, and an electrical heating element likewise wholly mounted on said actuator for thermally influencing the same whereby said switch may be moved to open circuit position, said switch being moved to closed circuit position only by manual operation of said actuator.

10. An electric switch comprising a horizontally disposed heat responsive actuator pivotally fixed at one end and unrestrained at the other end, a mercury electric contactor wholly mounted on said actuator and adapted to be moved to closed circuit position only by said actuator, and an electrical heating element wholly mounted on said actuator intermediate its ends for influencing the same, said mercury contactor being restorable to closed circuit position only by manually moving the unrestrained end of said actuator.

11. An electric switch comprising a tiltably mounted mercury electric contactor having a depressed portion formed in one end of the container thereof in which depressed portion the mercury of said contactor is adapted to be held when said contactor occupies open circuit position, and an actuator upon which said contactor is wholly mounted, said actuator being pivotally fixed at one end and having its other end unrestrained and being adapted to tilt said contactor to open circuit position only whereby the mercury is moved into said depressed portion of the container, said contactor being restorable to closed circuit position only by manually moving the unrestrained end of said actuator.

12. An electric switch comprising a tiltably mounted mercury electric contactor having a depressed portion formed in one end of the container thereof into which the mercury of said contactor is adapted to be held when said contactor occupies open circuit position, and a horizontally disposed actuator for tilting said contactor to open circuit position only, said actuator being pivotally mounted at one end and unrestrained at the other end and said contactor being wholly mounted on said actuator whereby the contactor may be tilted by said actuator to open circuit position only whereby the mercury is moved into said depressed portion of the container, said contactor being returned to open circuit position only by moving the unrestrained end of said actuator.

In witness whereof, I have hereunto subscribed my name.

JOHN C. BOGLE.